(12) United States Patent
Oh et al.

(10) Patent No.: US 10,409,123 B2
(45) Date of Patent: Sep. 10, 2019

(54) LIQUID CRYSTAL DISPLAY PREVENTING CONTRAST RATIO REDUCTION

(71) Applicant: Samsung Display Co., Ltd, Yongin-si, Gyeonggi-do (KR)

(72) Inventors: Jin-Ho Oh, Suwon-si (KR); Pil Gyu Kang, Yongin-si (KR); Wan Namgung, Asan-si (KR); Hong Min Yoon, Seoul (KR); Seung-Kyu Lee, Cheonan-si (KR); Ho Jun Lee, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 15/059,867

(22) Filed: Mar. 3, 2016

(65) Prior Publication Data
US 2016/0274420 A1    Sep. 22, 2016

(30) Foreign Application Priority Data
Mar. 18, 2015   (KR) ........................ 10-2015-0037478

(51) Int. Cl.
*G02F 1/1333*   (2006.01)
*G02F 1/1335*   (2006.01)
*G02F 1/1362*   (2006.01)

(52) U.S. Cl.
CPC .. *G02F 1/136286* (2013.01); *G02F 1/133512* (2013.01); *G02F 1/136209* (2013.01); *G02F 1/133305* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0122223 A1* | 5/2009 | Hayano | ............ | G02F 1/133305 349/58 |
| 2009/0161048 A1* | 6/2009 | Satake | ............ | G02F 1/133305 349/110 |
| 2013/0222746 A1* | 8/2013 | Itoh | ........................ | G02B 5/201 349/106 |
| 2013/0321740 A1 | 12/2013 | An et al. | | |

FOREIGN PATENT DOCUMENTS

| | | |
|---|---|---|
| JP | 2007-333818 A | 12/2007 |
| JP | 2009-150982 A | 7/2009 |
| JP | 2009-229667 A | 10/2009 |

* cited by examiner

*Primary Examiner* — Lauren Nguyen
(74) *Attorney, Agent, or Firm* — Innovation Counsel LLP

(57) ABSTRACT

A liquid crystal display that improve display quality by reducing light leakage is presented. The display includes a first substrate; a plurality of pixels disposed on the first substrate; a plurality of signal lines disposed on the first substrate and disposed at an edge of the plurality of pixels; a second substrate facing the first substrate; and a light blocking member disposed on the second substrate, overlapping the plurality of signal lines, and overlapping the edge of the plurality of pixel areas, wherein a width of the light blocking member overlapping the edge of the plurality of pixels varies depending on the position of the plurality of pixels.

19 Claims, 8 Drawing Sheets

LIQUID CRYSTAL DISPLAY PREVENTING CONTRAST RATIO REDUCTION

CROSS-REFERENCE TO RELATED APPLICATION

This application claims priority to and the benefit of Korean Patent Application No. 10-2015-0037478 filed in the Korean Intellectual Property Office on Mar. 18, 2015, the entire content of which is incorporated herein by reference.

BACKGROUND

(a) Technical Field

The disclosure relates to a liquid crystal display.

(b) Description of the Related Art

Liquid crystal displays (LCDs) are one of the most widely used flat panel displays today. An LCD includes a pair of panels provided with field-generating electrodes, such as pixel electrodes and a common electrode, and a liquid crystal (LC) layer interposed between the two panels. The LCD displays images by applying voltages to the field-generating electrodes to generate an electric field in the LC layer, and the orientations of LC molecules change in response to the electric field to adjust polarization of incident light.

To increase a contrast ratio of the liquid crystal display, a light blocking member is formed on an edge of each pixel area to prevent light leakage on the edge of the pixel area.

In this case, when two substrates of the liquid crystal display are misaligned, the misalignment is generated between the light blocking member and an opening region of the pixel area, thereby reducing a contrast ratio of the liquid crystal display and generating a display quality deterioration, such as stains.

The above information disclosed in this Background section is only to enhance the understanding of the background of the invention, and therefore it may contain information that does not form the prior art that is already known in this country to a person of ordinary skill in the art.

SUMMARY

The inventive concept provides a liquid crystal display preventing the contrast ratio from being reduced and display quality deterioration such as stains from being generated by preventing misalignment between the light blocking member and the opening region of the pixel area even though two substrates of the liquid crystal display are misaligned.

A liquid crystal display according to an exemplary embodiment includes a first substrate; a plurality of pixels disposed on the first substrate; a plurality of signal lines disposed on the first substrate and disposed at an edge of the plurality of pixels; a second substrate facing the first substrate; and a plurality of light blocking members disposed on the second substrate, overlapping the plurality of signal lines, and overlapping the edge of the plurality of pixel areas. Widths of the light blocking members overlapping the edges of the plurality of pixel areas may vary depending on the position of the plurality of pixels.

The width of the light blocking members may gradually increase and then decrease with increasing distance from the center portion of the liquid crystal display and decreasing distance to the edge of the liquid crystal display.

The liquid crystal display may be curved to have a curvature along a first direction that is perpendicular to a second direction parallel to an extending direction of the plurality of signal lines.

The plurality of signal lines may be at least one of a gate line and a data line.

The plurality of pixels may include a first pixel disposed at a center portion of the liquid crystal display; a second pixel, a fourth pixel, and a sixth pixel disposed at a first side of the first pixel and arranged in the first direction; and a third pixel, a fifth pixel, and a seventh pixel disposed at a second side of the first pixel and arranged in the first direction; and a second width of the light blocking member disposed at the first side of the second pixel and a third width of the light blocking member disposed at the second side of the third pixel may be larger than a first width of the light blocking member disposed adjacent to the first pixel. A fourth width of the light blocking member disposed at the first side of the fourth pixel may be wider than the second width, a fifth width of the light blocking member disposed at the second side of the fifth pixel may be wider than the third width. A sixth width of the light blocking member disposed at the first side of the sixth pixel is narrower than the fourth width, and a seventh width of the light blocking member disposed at the second side of the seventh pixel may be narrower than the fifth width.

A width of an opening of the first pixel between two adjacent light blocking members overlapping the first pixel may be different from widths of the opening of the second pixel, the third pixel, the fourth pixel, the fifth pixel, the sixth pixel, and the seventh pixel.

The plurality of pixels may further include an eighth pixel disposed at an edge portion of the liquid crystal display and disposed in the first side, and a ninth pixel disposed at the edge portion of the liquid crystal display and disposed in the second side, and an eighth width of the light blocking member disposed at the first side of the eighth pixel and a ninth width of the light blocking member disposed at the second side of the ninth pixel may be substantially the same as the first width of the light blocking member disposed at the edge of the first pixel.

The liquid crystal display may further include a sealant disposed at the first side of the eighth pixel and the second side of the ninth pixel.

According to the liquid crystal display according to an exemplary embodiment of the inventive concept, although the misalignment is generated between two substrates of the liquid crystal display, the misalignment may be prevented between the opening regions of the light blocking member and the pixel areas, thereby reducing the contrast ratio of the liquid crystal display and preventing display quality deterioration such as stains.

DETAILED DESCRIPTION OF THE EMBODIMENTS

Figure 1:
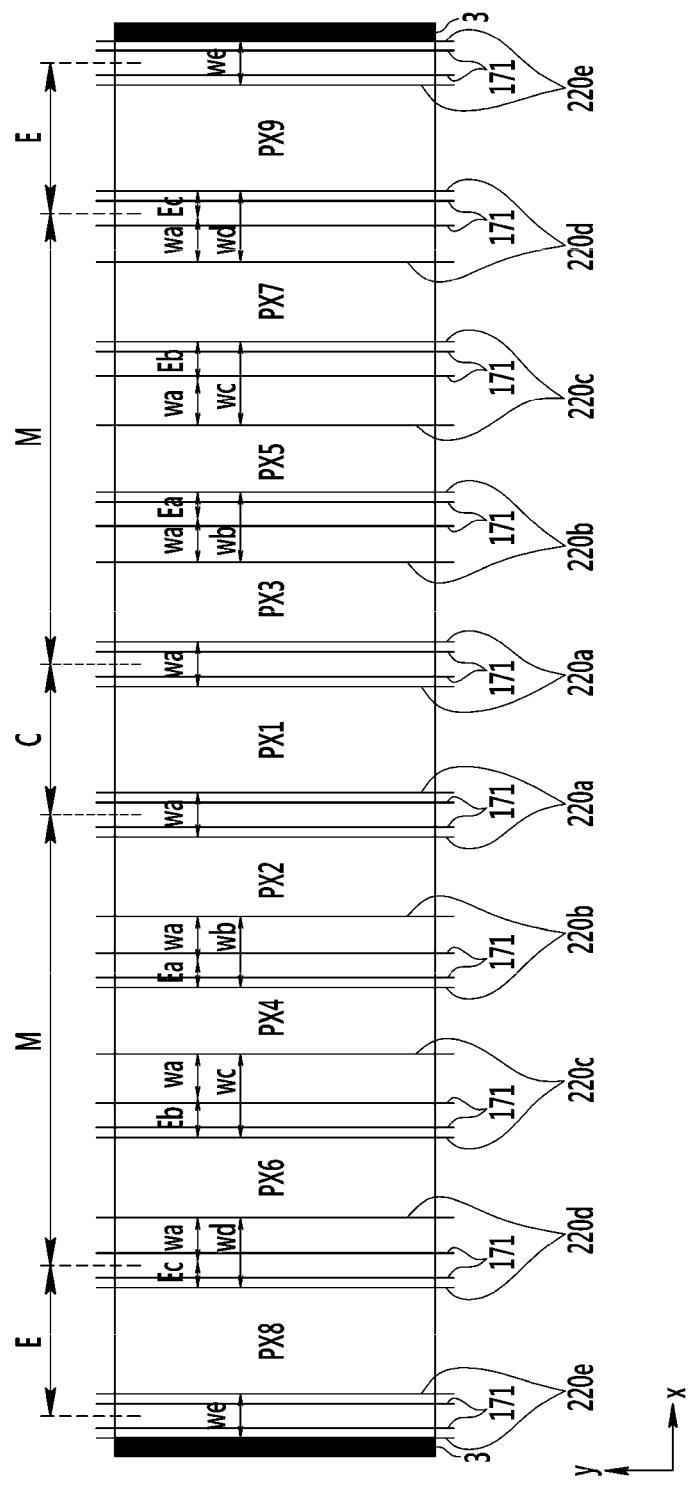
FIG. 1 is a layout view of a light blocking member and an opening region of a pixel in a liquid crystal display according to an exemplary embodiment of the present inventive concept.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display according to an exemplary embodiment will be described with reference to FIG. 1. FIG. 1 is a layout view of a light blocking member and an opening region of a pixel in a liquid crystal display according to an exemplary embodiment. FIG. 1 shows an x-y coordinate. The x-direction is herein also referred to as the "first direction."

Referring to FIG. 1, the liquid crystal display according to the present exemplary embodiment includes a first pixel PX1 disposed at a center portion C of the liquid crystal display, a second pixel PX2, a third pixel PX3, a fourth pixel PX4, a fifth pixel PX5, a sixth pixel PX6, and a seventh pixel PX7 disposed at a middle portion M on both sides of the center portion C, and an eighth pixel PX8 and a ninth pixel PX9 disposed at both edge portions E of the liquid crystal display.

A first light blocking member 220a disposed on two edges of the first pixel PX1 is disposed at the center portion C of the liquid crystal display, overlapping signal lines 171. A first light blocking member 220a disposed on both sides of the first pixel PX1 have a first width Wa.

Among the second pixel PX2, the third pixel PX3, the fourth pixel PX4, the fifth pixel PX5, the sixth pixel PX6, and the seventh pixel PX7 disposed at the middle portion M at both sides of the center portion C, the second pixel PX2, the fourth pixel PX4, and the sixth pixel PX6 are disposed at a left side with respect to the first pixel PX1, and the third pixel PX3, the fifth pixel PX5, and the seventh pixel PX7 are disposed at a right side with respect to the first pixel PX1.

The second pixel PX2, the fourth pixel PX4, and the sixth pixel PX6 are sequentially disposed to be farther away from the first pixel PX1 to one side ("the first side") of the first pixel PX1, and the third pixel PX3, the fifth pixel PX5, and the seventh pixel PX7 are sequentially disposed to be farther away from the first pixel PX1 to the other side ("the second side") of the first pixel PX1. Referring to FIG. 1, "the first side" is the left side and "the second side" is the right side. However, this is not a limitation of the inventive concept.

A second light blocking member 220b overlapping the signal line 171 adjacent to the second pixel PX2 and the third pixel PX3 disposed at the middle portion M has a second width Wb. The second width Wb is wider than the first width Wa by a difference of a first expansion Ea(Wb−Wa). The first expansion Ea is disposed adjacent to or in the edge portion E of both sides of the liquid crystal display. Accordingly, widths of areas between two adjacent the light blocking members overlapping the second pixel PX2 and the third pixel PX3 are narrower than a width of an area between two adjacent the light blocking members overlapping the first pixel PX1 in a direction perpendicular to a direction that the signal line 171 extends.

A third light blocking member 220c overlapping the signal line 171 adjacent to the fourth pixel PX4 and the fifth pixel PX5 has a third width Wc. The third width Wc is wider than the first width Wa and the second width Wb. The third width Wc is wider than the first width Wa by a second expansion Eb. The second expansion Eb is disposed toward the edge portion E of both sides of the liquid crystal display. Accordingly, widths of areas between two adjacent the light blocking members overlapping the fourth pixel PX4 and the fifth pixel PX5 are narrower than the widths of the areas between two adjacent the light blocking members overlapping the second pixel PX2 and the third pixel PX3 and are narrower than the width of the area between two adjacent the light blocking members overlapping the first pixel PX1 measured in the direction perpendicular to the direction that the signal line 171 extends.

A fourth light blocking member 220d overlapping the signal line 171 adjacent to the sixth pixel PX6 and the seventh pixel PX7 has a fourth width Wd. The fourth width Wd is wider than the first width Wa and is narrower than the third width Wc. The fourth width Wd may be the almost same as the second width Wb. The fourth width Wd is wider than the first width Wa by the width of the third expansion Ec. The third expansion Ec is disposed closer to the eighth pixel PX8 than to the sixth pixel PX6, and closer to the ninth pixel PX9 than to the seventh pixel PX7, and is at least partially in the edge portions E of the liquid crystal display. Accordingly, measured in the x-direction that is perpendicular to the extending direction of the signal line 171, widths of areas between two adjacent the light blocking members overlapping the sixth pixel PX6 and the seventh pixel PX7 are narrower than the width of the area between two adjacent the light blocking members overlapping the first pixel PX1 and are wider than the widths of the areas between two adjacent the light blocking members overlapping the fourth pixel PX4 and the fifth pixel PX5. The widths of the areas between two adjacent the light blocking members overlapping the sixth pixel PX6 and the seventh pixel PX7 may be the same as the widths of the areas between two adjacent the light blocking members overlapping the second pixel PX2 and the third pixel PX3.

A sealant 3 is disposed at an outer edge of both edge portions E of the liquid crystal display, and a fifth light blocking member 220e overlapping the signal line 171 adjacent to the edge farther from the first pixel PX1 among the edges of the eighth pixel PX8 and the ninth pixel PX9 disposed at the edge portion E has a fifth width We. The fifth width We may be nearly the same as the first width Wa of the first light blocking member 220a overlapping the signal line 171 disposed at both sides of the first pixel PX1 disposed at the center portion C of the liquid crystal display.

The signal line 171 may be at least one of the gate line, the data line, and the storage voltage line.

According to the liquid crystal display according to the shown exemplary embodiment, the first pixel PX1, the second pixel PX2, the third pixel PX3, the fourth pixel PX4, the fifth pixel PX5, the sixth pixel PX6, and the seventh pixel PX7 are respectively shown as one separate pixel.

However, the first pixel PX1, the second pixel PX2, the third pixel PX3, the fourth pixel PX4, the fifth pixel PX5, the sixth pixel PX6, and the seventh pixel PX7 may respectively include a plurality of pixels arranged along the first direction or the second direction.

Figure 2:
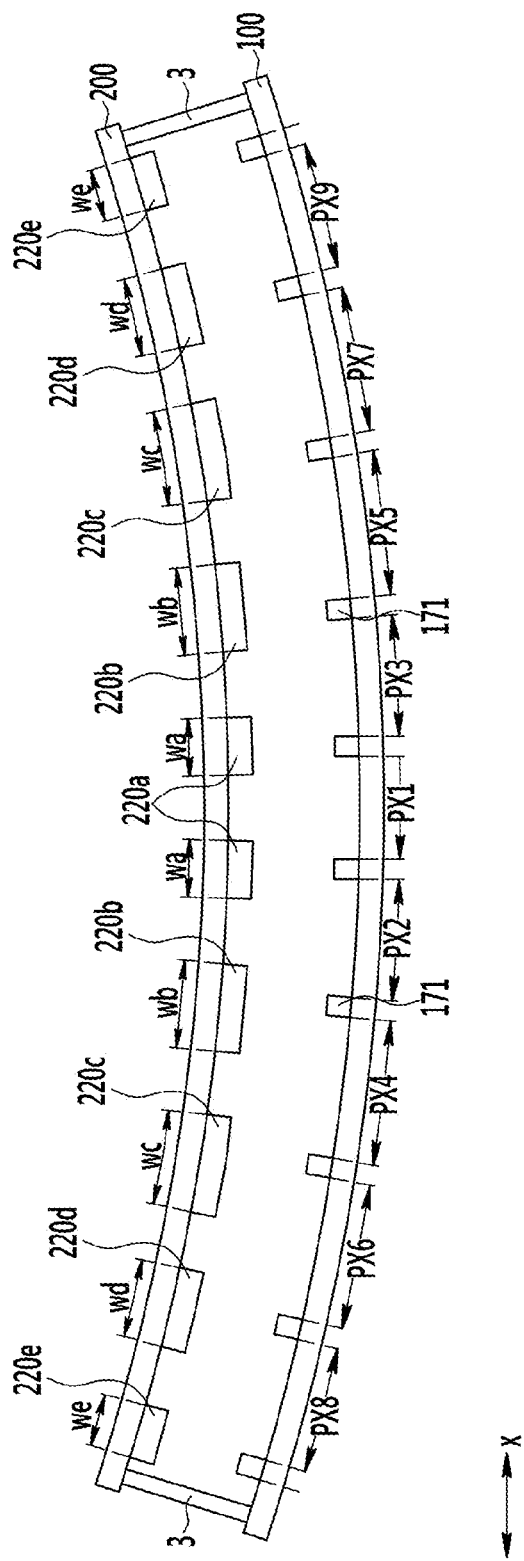
FIG. 2 is a cross-sectional view of a liquid crystal display according to another exemplary embodiment of the inventive concept.

Next, the liquid crystal display according to another exemplary embodiment will be described with reference to FIG. 2. FIG. 2 is a cross-sectional view of a liquid crystal display according to an exemplary embodiment.

Referring to FIG. 2, the liquid crystal display according to the present exemplary embodiment includes a first substrate 100 in which a plurality of signal lines 171 are disposed and a second substrate 200 facing the first substrate 100 and disposed with a light blocking member 220.

As shown in FIG. 2, the liquid crystal display is curved to have a curvature in a first direction x.

Accordingly, when the liquid crystal display is curved, compress forces applied to the first substrate 100 and the second substrate 200 are different from each other.

According to the liquid crystal display according to the shown exemplary embodiment, compared with the first substrate 100 disposed with the signal line 171, the larger compress force is applied to the second substrate 200 in which the light blocking member 220 is disposed. In this case, in the center portion C of the liquid crystal display including the first pixel PX1, the misalignment is not generated between the first substrate 100 and the second substrate 200. However, the misalignment may be generated between the first substrate 100 and the second substrate 200 in the middle portion M disposed at both sides of the center portion C. Also, since the sealant 3 is disposed in the outer region adjacent to both edge portions E of the liquid crystal display, the misalignment is relatively small between the first substrate 100 and the second substrate 200 in both edge portions E of the liquid crystal display.

As described above, the first light blocking member 220a overlapping the signal line 171 disposed at both sides of the first pixel PX1 disposed at the center portion C of the liquid crystal display has the first width Wa.

The second light blocking member 220b overlapping the signal line 171 adjacent to the far edge from the first pixel PX1 among the edges of the second pixel PX2 and the third pixel PX3 disposed at the middle portion M has the second width Wb. The second width Wb is wider than the first width Wa. Accordingly, the widths of the areas between two adjacent the light blocking members overlapping the second pixel PX2 and the third pixel PX3 are narrower than the width of the area between two adjacent the light blocking members overlapping the first pixel PX1 measured in a direction perpendicular to a direction in which the signal line 171 extends.

A third light blocking member 220c overlapping the signal line 171 adjacent to the far edge from the first pixel PX1 among the edges of the fourth pixel PX4 and the fifth pixel PX5 disposed at the side of the second pixel PX2 and the third pixel PX3 has a third width Wc. The third width Wc is wider than the first width Wa and the second width Wb. Accordingly, the widths of the areas between two adjacent the light blocking members overlapping the fourth pixel PX4 and the fifth pixel PX5 are narrower than the widths of the areas between two adjacent the light blocking members overlapping the second pixel PX2 and the third pixel PX3 and are narrower than the width of the area between two adjacent the light blocking members overlapping the first pixel PX1 measured in the x-direction perpendicular to the direction in which the signal line 171 extends.

A fourth light blocking member 220d overlapping the signal line 171 adjacent to the far edge from the first pixel PX1 among the edges of the sixth pixel PX6 and the seventh pixel PX7 disposed at the sides of the fourth pixel PX4 and the fifth pixel PX5 has a fourth width Wd. The fourth width Wd is wider than the first width Wa and is narrower than the third width Wc. Accordingly, measured in the x-direction perpendicular to the extending direction of the signal line 171, the widths of the areas between two adjacent the light blocking members overlapping the sixth pixel PX6 and the seventh pixel PX7 are narrower than the width of area between two adjacent the light blocking members overlapping the first pixel PX1 and are wider than the width of the areas between two adjacent the light blocking members overlapping the fourth pixel PX4 and the fifth pixel PX5. The widths of the areas between two adjacent the light blocking members overlapping the sixth pixel PX6 and the seventh pixel PX7 may be the same as the width of the areas between two adjacent the light blocking members overlapping the second pixel PX2 and the third pixel PX3.

The fifth light blocking member 220e overlapping the signal line 171 adjacent to the edges of the eighth pixel PX8 and the ninth pixel PX9 disposed at both edge portions E of the liquid crystal display has the fifth width We. The fifth width We may be almost the same as the first width Wa of the first light blocking member 220a overlapping the signal line 171 disposed at both sides of the first pixel PX1 at the center portion C of the liquid crystal display.

The signal line 171 may be at least one of the gate line, the data line, and the storage voltage line.

The width of the light blocking members 220a, 220b, 220c, 220d, 220e (collectively referred to as 220) disposed at the edge of each pixel gets first wider and then narrower with distance from the center portion C of the liquid crystal display moving toward the edge portion E of the liquid crystal display along the first direction x. Accordingly, the light blocking member disposed at the edge of each pixel may overlap the signal line disposed at the edge of each pixel area and the width thereof becomes firstly wider and then narrower with distance from the center portion C of the liquid crystal display moving toward the edge portion E of the liquid crystal display along the first direction x.

Thus, according to the liquid crystal display according to the present exemplary embodiment, along the curvature direction in which the liquid crystal display is curved, the width of the light blocking members 220 disposed at the edge of each pixel becomes firstly wider and then narrower with distance from the center portion C of the liquid crystal display moving toward the edge portion E of the liquid crystal display. Accordingly, although the compressive forces of different strengths are applied to the first substrate 100 and the second substrate 200 disposed at the middle portion M of the liquid crystal display, the signal line 171 disposed at the edge of each pixel area overlaps the light blocking member 220. Thus, although the compressive forces of different strengths are applied between the first substrate 100 and the second substrate 200 facing each other, light leakage near the edge of each pixel area may be reduced, thereby preventing an adverse effect on the contrast ratio of the liquid crystal display. Display quality deterioration such as formation of stains due to the light leakage at the edge of the pixel area may also be reduced.

This will be described in detail with reference to FIG. 3 and FIG. 4.

Figure 3:
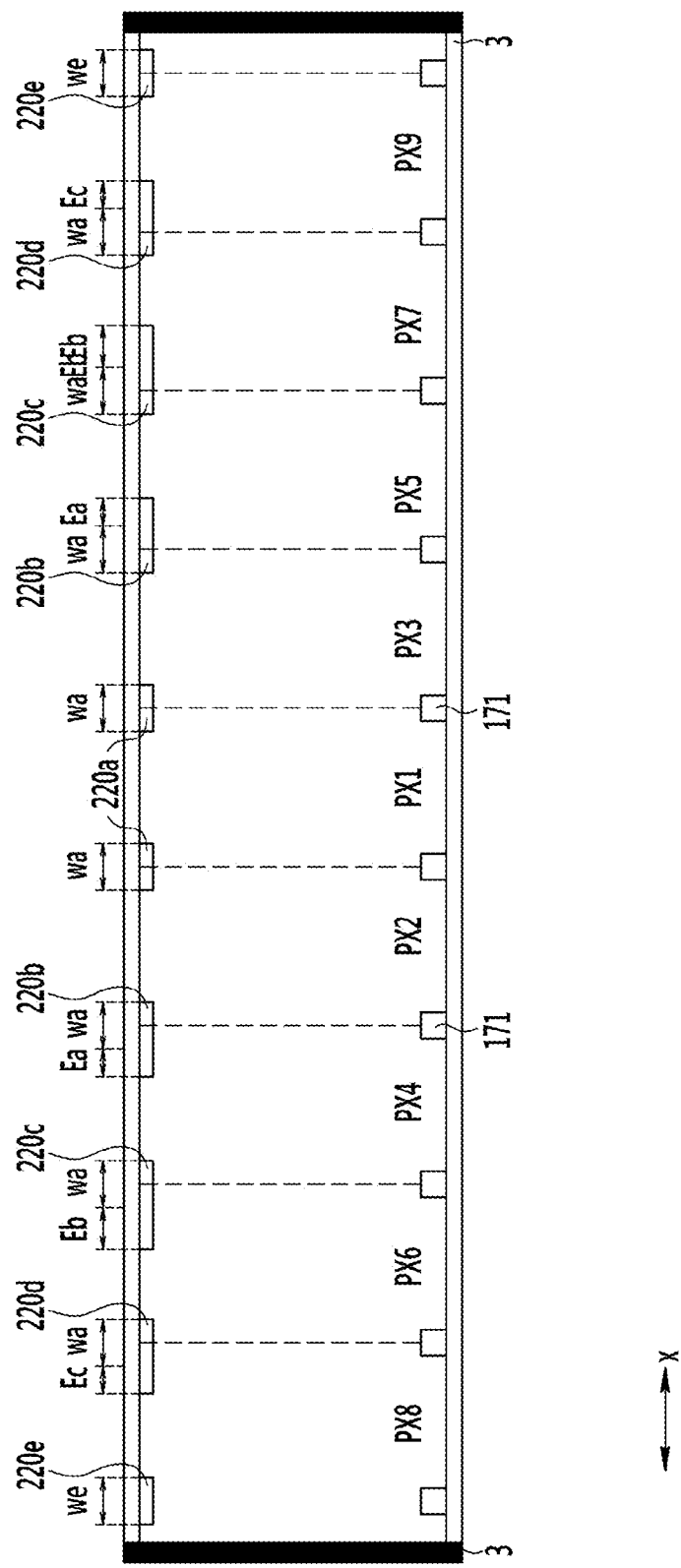
FIG. 3 and FIG. 4 are cross-sectional views of a liquid crystal display according to an exemplary embodiment of the inventive concept.
Figure 4:
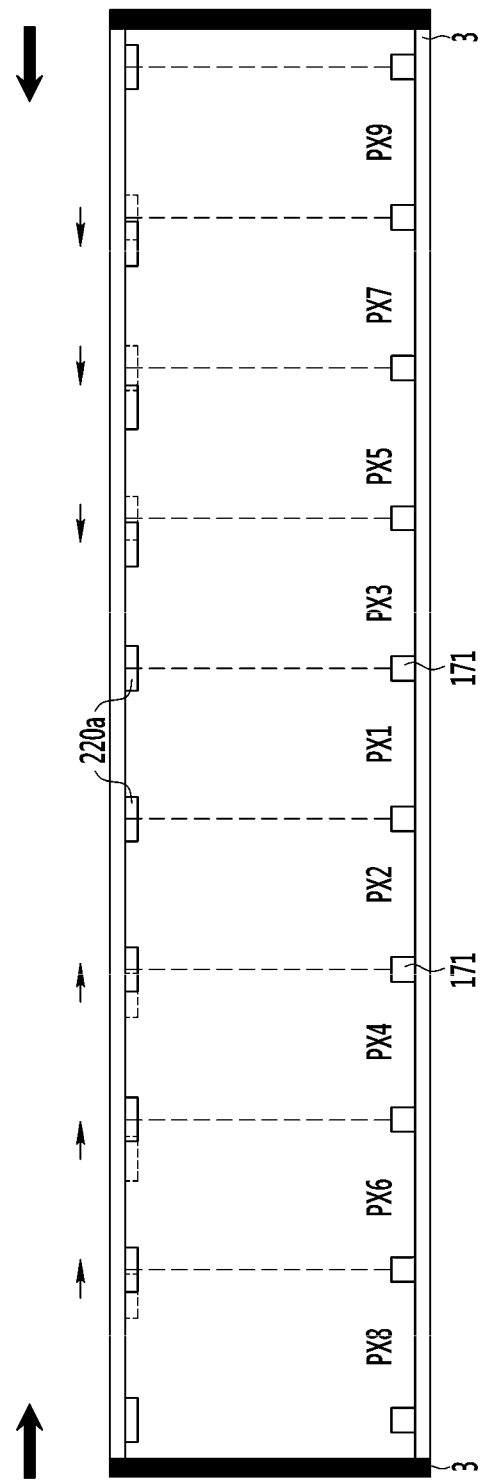

FIG. 3 is a cross-sectional view of a liquid crystal display according to an exemplary embodiment, and FIG. 4 is a cross-sectional view of a liquid crystal display according to an exemplary embodiment when applying an external force in the x-direction to the liquid crystal display.

Referring to FIG. 3, the liquid crystal display according to the present exemplary embodiment includes a first pixel PX1 disposed at a center portion C, a second pixel PX2, a third pixel PX3, a fourth pixel PX4, a fifth pixel PX5, a sixth pixel PX6, and a seventh pixel PX7 disposed at a middle portion M on both sides of the center portion C, and an eighth pixel PX8 and a ninth pixel PX9 disposed at both edge portions E of the liquid crystal display.

The first light blocking member 220a overlapping the signal lines 171 disposed at both edges of the first pixel PX1 disposed at the center portion C of the liquid crystal display has the first width Wa.

Among the second pixel PX2, the third pixel PX3, the fourth pixel PX4, the fifth pixel PX5, the sixth pixel PX6, and the seventh pixel PX7 disposed at the middle portion M at both sides of the center portion C, the second pixel PX2, the fourth pixel PX4, and the sixth pixel PX6 are disposed at a left side with respect to the first pixel PX1, and the third pixel PX3, the fifth pixel PX5, and the seventh pixel PX7 are disposed at a right side with respect to the first pixel PX1.

The second pixel PX2, the fourth pixel PX4, and the sixth pixel PX6 are sequentially disposed to be farther away from the first pixel PX1, the third pixel PX3, the fifth pixel PX5, and the seventh pixel PX7 are sequentially disposed to be farther away from the first pixel PX1.

The second light blocking member 220b overlapping the signal line 171 adjacent to the edges of the second pixel PX2 and the third pixel PX3 disposed at the center portion M has the second width Wb. The second width Wb is wider than the first width Wa, that is, the second width Wb is wider than the first width Wa by a first expansion Ea. The first expansion Ea is disposed toward the edge portion E of both sides of the liquid crystal display. Accordingly, the widths of the areas between two adjacent the light blocking members overlapping the second pixel PX2 and the third pixel PX3 are narrower than the width of the area between two adjacent the light blocking members overlapping the first pixel PX1 in the x-direction.

The third light blocking member 220c overlapping the signal line 171 adjacent to the edges of the fourth pixel PX4 and the fifth pixel PX5 disposed at the side of the second pixel PX2 and the third pixel PX3 has the third width Wc. The third width Wc is wider than the first width Wa and the second width Wb. The third width Wc is wider than the first width Wa by a second expansion Eb. The second expansion Eb is disposed toward the edge portion E of both sides of the liquid crystal display. Accordingly, the width of the areas between two adjacent the light blocking members overlapping the fourth pixel PX4 and the fifth pixel PX5 are narrower than the width of the areas between two adjacent the light blocking members overlapping the second pixel PX2 and the third pixel PX3 and is narrower than the width of the area between two adjacent the light blocking members overlapping the first pixel PX1 measured in the x-direction.

The fourth light blocking member 220d overlapping the signal line 171 adjacent to the edges of the sixth pixel PX6 and the seventh pixel PX7 disposed at the sides of the fourth pixel PX4 and the fifth pixel PX5 has the fourth width Wd. The fourth width Wd is wider than the first width Wa but narrower than the third width Wc. The fourth width Wd may be nearly the same as the second width Wb. The fourth width Wd is wider than the first width Wa by the third expansion Ec. The third expansion Ec is disposed toward both edge portions E of the liquid crystal display. Accordingly, measured in the x-direction, the widths of the areas between two adjacent the light blocking members overlapping the sixth pixel PX6 and the seventh pixel PX7 are narrower than the width of the area between two adjacent the light blocking members overlapping the first pixel PX1 and are wider than the widths of the areas between two adjacent the light blocking members overlapping the fourth pixel PX4 and the fifth pixel PX5. The widths of the areas between two adjacent the light blocking members overlapping the sixth pixel PX6 and the seventh pixel PX7 may be the same as the widths of the areas between two adjacent the light blocking members overlapping the second pixel PX2 and the third pixel PX3.

The sealant 3 is disposed in the outer region adjacent to both edge portions E of the liquid crystal display, and a fifth light blocking member 220e overlapping the signal line 171 adjacent to the far edge from the first pixel PX1 among the edges of the eighth pixel PX8 and the ninth pixel PX9 disposed at the edge portion E has the fifth width We. The fifth width We may be nearly the same as the first width Wa of the first light blocking member 220a overlapping the signal line 171 disposed at both sides of the first pixel PX1 disposed at the center portion C of the liquid crystal display.

Now, referring to FIG. 4, the misalignment generated between the first substrate 100 including the signal line 171 and the second substrate 200 including the light blocking member 220 will be described when applying the compressive force to the second substrate 200 including the light blocking member 220 of the liquid crystal display according to the exemplary embodiment. The arrows show the direction in which the compressive force is applied.

If the compressive force is applied to the second substrate 200 including the light blocking member 220 of the liquid crystal display according to the exemplary embodiment, the second light blocking member 220b, the third light blocking member 220c, and the fourth light blocking member 220d overlapping the second pixel PX2, the fourth pixel PX4, and the sixth pixel PX6 that are disposed in the middle portion M to the left side of the first pixel PX1 are pushed toward the first pixel PX1. Similarly, the second light blocking member 220b, the third light blocking member 220c, and the fourth light blocking member 220d overlapping the third pixel PX3, the fifth pixel PX5, and the seventh pixel PX7 disposed to the right side of the first pixel PX1 in the center portion C are pushed to the left side with respect to the first pixel PX1. The second light blocking member 220b, the third light blocking member 220c, and the fourth light blocking member 220d according to an exemplary embodiment have the first expansion Ea, the second expansion Eb, and the third expansion Ec extending to the side of both edge portions E of the liquid crystal display, compared with the first light blocking member 220a. Hence, even if the second light blocking member 220b, the third light blocking member 220c, and the fourth light blocking member 220d are pushed toward the center portion C of the liquid crystal display, they are likely to still overlap the signal line 171.

Accordingly, even though the compressive forces of different strengths are applied between the first substrate 100 and the second substrate 200 disposed at the middle portion of the liquid crystal display, the signal line 171 overlaps the light blocking member 220. Thus, the compressive forces of different strengths are applied between the first substrate 100 and the second substrate 200 facing each other, and light leakage near the signal line 171 may be prevented, thereby increasing the contrast ratio of the liquid crystal display and preventing display quality deterioration such as the stains due to the light leakage generated at the edge of the pixel area.

Figure 5:
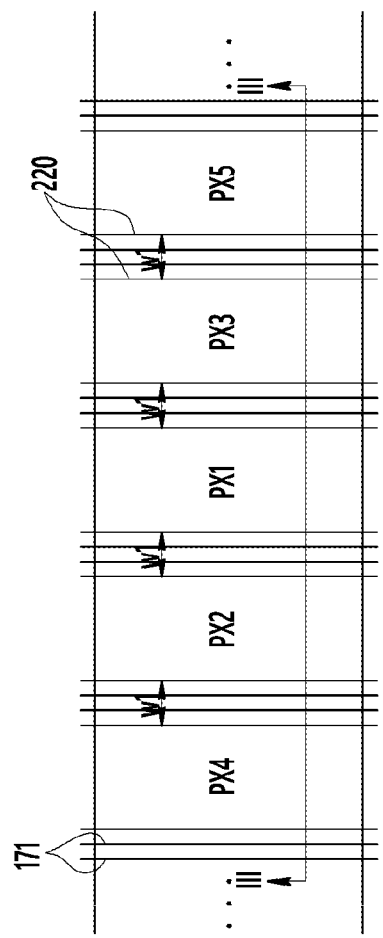
FIG. 5 is a layout view of a conventional liquid crystal display.
Figure 6:
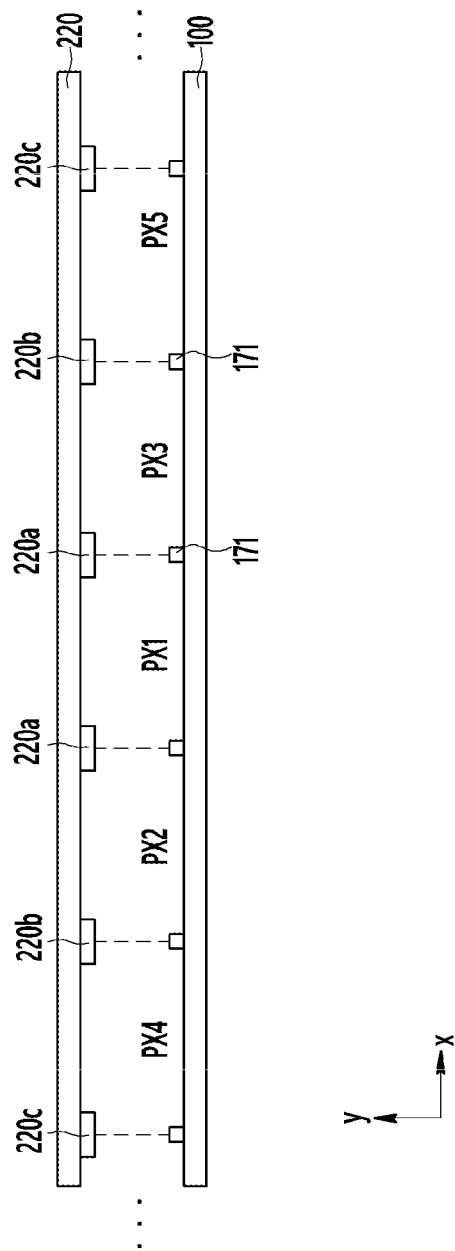
FIG. 6 is a cross-sectional view of the liquid crystal display of FIG. 5 in the VI-VI direction.
Figure 7:
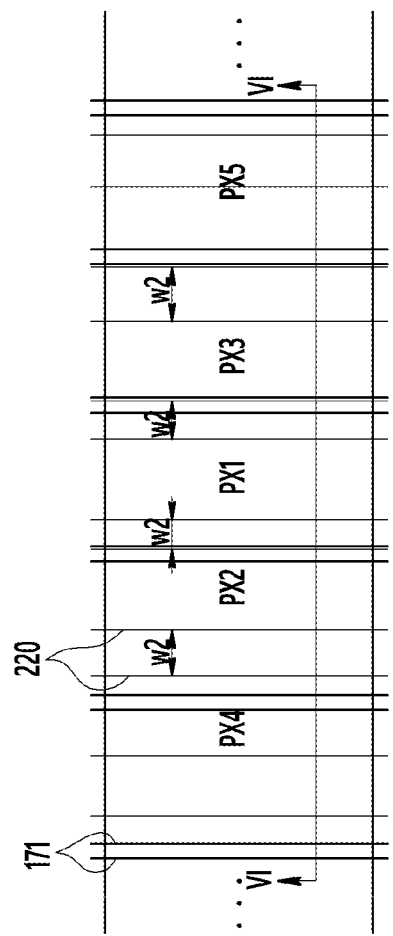
FIG. 7 is a layout view of a conventional liquid crystal display.

Next, the opening region of the light blocking member and the pixel of the conventional liquid crystal display will be described with reference to FIG. 5, FIG. 6, FIG. 7, and FIG. 8. FIG. 5 is a layout view of a conventional liquid crystal display, and FIG. 6 is a cross-sectional view of the liquid crystal display of FIG. 5. FIG. 7 is a layout view of a conventional liquid crystal display when applying external force to the liquid crystal display of FIG. 5, and FIG. 8 is a cross-sectional view of the liquid crystal display of FIG. 7.

First, referring to FIG. 5 and FIG. 6, the conventional liquid crystal display includes the first pixel PX1 disposed at the center portion C of the liquid crystal display, and the second pixel PX2, the third pixel PX3, the fourth pixel PX4, and the fifth pixel PX5 disposed at the middle portion M at both sides of the center portion C. The light blocking member 220 overlapping the signal line 171 disposed at both sides of each pixel PX1, PX2, PX3, PX4, and PX5 has the same width. Accordingly, the width of the opening of each pixel PX1, PX2, PX3, PX4, and PX5 is the same.

Figure 8:
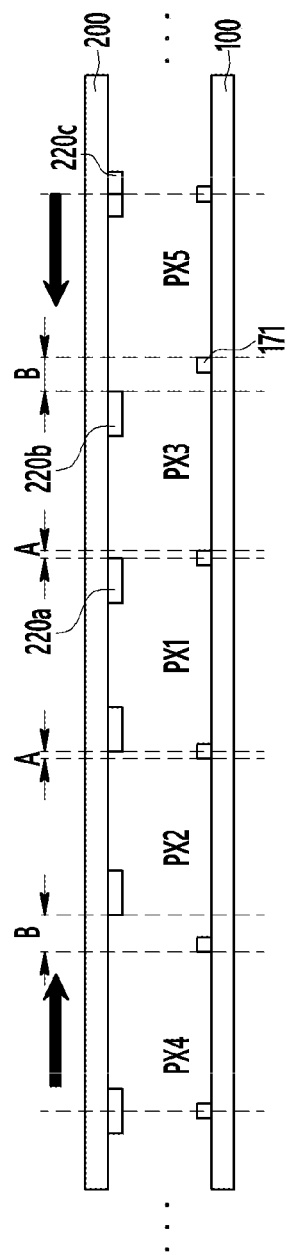
FIG. 8 is a cross-sectional view of the liquid crystal display of FIG. 7 in the VII-VII direction.

FIG. 7 and FIG. 8 depict the situation where compressive force is applied to the second substrate 200 on which the light blocking members 220 are disposed. Misalignment is generated between the first substrate 100 on which the signal line 171 is formed and the second substrate 200 on which the light blocking members 220 are formed. The light blocking member 220 overlapping the signal line 171 of the second pixel PX2, the third pixel PX3, the fourth pixel PX4, and the fifth pixel PX5 disposed in the middle portion M of the liquid crystal display is moved toward the first pixel PX1 disposed at the center portion C of the liquid crystal display, and the widths of the light blocking members 220 is decreased, thereby being the second width W2. Thus, when the misalignment is generated between the first substrate 100 and the second substrate 200 in the conventional liquid crystal display, the signal lines 171 adjacent to the second pixel PX2, the third pixel PX3, the fourth pixel PX4, and the fifth pixel PX5 disposed at the middle portion M at both sides of the center portion C of the liquid crystal display are not aligned with the light blocking members 220. The mis-aligned widths A and B increase with increasing distance from the middle portion M of the liquid crystal display. Accordingly, light leakage may happen at the edge of the signal line 171 that is not covered by the light blocking members 220. This light leakage reduces the contrast ratio of the liquid crystal display and causes stain generation at the edge of the pixel area, both of which result in display quality deterioration.

However, according to the liquid crystal display of an exemplary embodiment, the width of the light blocking member 220 overlapping the signal line 171 is made first wider and then narrower in going from the center portion C toward the edge portion E of the liquid crystal display. With this configuration, even if the compressive forces of different strengths are applied between the first substrate 100 and the second substrate 200 at the middle portion M of the liquid crystal display, the signal line 171 overlaps the light blocking member 220. Thus, when the compressive forces of different strengths are applied between the first substrate 100 and the second substrate 200 facing each other, light leakage near the signal line 171 may be prevented. As a result, the contrast ratio of the liquid crystal display is increased and display quality deterioration from visual artifacts such as a stain in the edge of the pixel area may be prevented.

According to the above-described liquid crystal display according to an exemplary embodiment, the center portion C of the liquid crystal display includes one first pixel PX1, and a plurality of first pixels PX1 may be disposed at the center portion C of the liquid crystal display. Also, the second pixel PX2, the third pixel PX3, the fourth pixel PX4, the fifth pixel PX5, the sixth pixel PX6, and the seventh pixel PX7 disposed at the middle portion M of the liquid crystal display are respectively described as one pixel, though they may respectively include a plurality of pixels.

While this inventive concept has been described in connection with what is presently considered to be practical exemplary embodiments, it is to be understood that the inventive concept is not limited to the disclosed embodiments but, on the contrary, is intended to cover various modifications and equivalent arrangements included within the spirit and scope of the appended claims.

DESCRIPTION OF SYMBOLS

| 100: first substrate | 171: signal line |
|---|---|
| 200: second substrate | 220: light blocking member |
| 3: sealant | C: center portion |
| E: edge portion | M: middle portion |
| PX1: first pixel | PX2: second pixel |
| PX3: third pixel | PX4: fourth pixel |
| PX5: fifth pixel | PX6: sixth pixel |
| PX7: seventh pixel | PX8: eighth pixel |
| PX9: ninth pixel | |

What is claimed is:

1. A liquid crystal display comprising:
    a first substrate;
    a plurality of pixels disposed on the first substrate;
    a plurality of signal lines disposed on the first substrate and disposed at edges of the plurality of pixels;
    a second substrate facing the first substrate; and
    a plurality of light blocking members disposed on the second substrate, overlapping the plurality of signal lines, and overlapping the edge of the plurality of pixel areas, the plurality of light blocking members comprising a first light blocking member closest to a center portion of the liquid crystal display along a first direction, a second light blocking member closest to an edge portion of the liquid crystal display along the first direction, a third light blocking member between the first light blocking member and the second light blocking member along the first direction, a fourth light blocking member between the first light blocking member and the third light blocking member along the first direction, and a fifth blocking member between the third light blocking member and the second light blocking member along the first direction,
    wherein the liquid crystal display is curved along the first direction,
    wherein widths of the light blocking members overlapping the edges of the plurality of pixel areas varies along the first direction,
    wherein the first light blocking member and the second light blocking each have smaller widths than widths of the fourth light blocking member and the fifth light blocking member along the first direction, and the first light blocking member and the second light blocking member do not directly contact each other, and
    wherein the fourth light blocking member and the fifth light blocking member each have smaller widths than a width of the third light blocking member along the first direction, and the fourth light blocking member and the fifth light blocking member do not directly contact each other.

2. The liquid crystal display of claim 1, wherein:
the widths of the light blocking members increase and then decrease with increasing distance from the center portion of the liquid crystal display and decreasing distance to the edge of the liquid crystal display.

3. The liquid crystal display of claim 2, wherein:
the first direction is perpendicular to an extending direction of the plurality of signal lines.

4. The liquid crystal display of claim 3, wherein:
the plurality of signal lines include one of a gate line and a data line.

5. The liquid crystal display of claim 3, wherein the plurality of pixels comprises:
a first pixel disposed at a center portion of the liquid crystal display,
a second pixel, a fourth pixel, and a sixth pixel disposed at a first side of the first pixel and arranged in the first direction, and
a third pixel, a fifth pixel, and a seventh pixel disposed at a second side of the first pixel and arranged in the first direction,
a second width of the light blocking member disposed at the first side of the second pixel and a third width of the light blocking member disposed at the second side of the third pixel is larger than a first width of the light blocking member disposed adjacent to the first pixel,
a fourth width of the light blocking member disposed at the first side of the fourth pixel is wider than the second width,
a fifth width of the light blocking member disposed at the second side of the fifth pixel is wider than the third width,
a sixth width of the light blocking member disposed at the first side of the sixth pixel is narrower than the fourth width, and
a seventh width of the light blocking member disposed at the second side of the seventh pixel is narrower than the fifth width.

6. The liquid crystal display of claim 5, wherein:
a width of an opening of the first pixel between two adjacent light blocking members overlapping the first pixel is different from widths of the opening of the second pixel, the third pixel, the fourth pixel, the fifth pixel, the sixth pixel, and the seventh pixel.

7. The liquid crystal display of claim 5, wherein:
the plurality of pixels further includes
an eighth pixel disposed at an edge portion of the liquid crystal display and disposed at the first side, and
a ninth pixel disposed at the edge portion of the liquid crystal display and disposed at the second side,
an eighth width of the light blocking member disposed at the first side of the eighth pixel and a ninth width of the light blocking member disposed at the second side of the ninth pixel are substantially the same as the first width of the light blocking member disposed at the edge of the first pixel.

8. The liquid crystal display of claim 7, further comprising:
a sealant disposed at the first side of the eighth pixel and the second side of the ninth pixel.

9. The liquid crystal display of claim 1, wherein:
the first direction is perpendicular to an extending direction of the plurality of signal lines.

10. The liquid crystal display of claim 9, wherein:
the plurality of signal lines is at least one of a gate line and a data line.

11. The liquid crystal display of claim 9, wherein:
the plurality of pixels includes
a first pixel disposed at a center portion of the liquid crystal display,
a second pixel, a fourth pixel, and a sixth pixel disposed at a first side of the first pixel and arranged in the direction that is perpendicular to the extending direction of the plurality of signal lines, and
a third pixel, a fifth pixel, and a seventh pixel disposed at a second side of the first pixel and arranged in the direction that is perpendicular to the extending direction of the plurality of signal lines, wherein the second side is opposite of the first side,
a second width of the light blocking member disposed at the first side among the edges of the second pixel and a third width of the light blocking member disposed at the second side among the edges of the third pixel is larger than a first width of the light blocking member disposed at the edge of the first pixel,
a fourth width of the light blocking member disposed at the first side of the fourth pixel is wider than the second width,
a fifth width of the light blocking member disposed at the second side of the fifth pixel is wider than the third width,
a sixth width of the light blocking member disposed at the first side of the sixth pixel is narrower than the fourth width, and
a seventh width of the light blocking member disposed at the second side of the seventh pixel is narrower than the fifth width.

12. The liquid crystal display of claim 11, wherein:
a width of an opening of the first pixel between two adjacent light blocking members overlapping the first pixel is different from widths of the opening of the second pixel, the third pixel, the fourth pixel, the fifth pixel, the sixth pixel, and the seventh pixel.

13. The liquid crystal display of claim 11, wherein:
the plurality of pixels further includes
an eighth pixel disposed at an edge portion of the liquid crystal display to the first side of the first pixel, and
a ninth pixel disposed at the edge portion of the liquid crystal display to the second side of the first pixel,
wherein an eighth width of the light blocking member disposed at the first side of the eighth pixel and a ninth width of the light blocking member disposed at the second side of the ninth pixel is nearly the same as the first width of the light blocking member disposed adjacent to the first pixel.

14. The liquid crystal display of claim 13, further comprising:
a sealant disposed at the first side of the eighth pixel and the second side of the ninth pixel.

15. The liquid crystal display of claim 1, wherein:
the plurality of signal lines includes at least one of a gate line and a data line.

16. The liquid crystal display of claim 1, wherein:
the plurality of pixels includes
a first pixel disposed at a center portion of the liquid crystal display,
a second pixel, a fourth pixel, and a sixth pixel disposed at a first side of the first pixel and arranged in the direction that is perpendicular to the extending direction of the plurality of signal lines, and a third pixel, a fifth pixel, and a seventh pixel disposed at a second side of the first pixel and arranged in the direction that is perpendicular to the extending direction of the plurality of signal lines, wherein the second side is opposite of the first side, a second width of the light blocking member disposed at the first side among the edges of the second pixel and a third width of the light blocking member disposed at the second side among the edges of the third pixel is larger than a first width of the light blocking member disposed at the edge of the first pixel, a fourth width of the light blocking member disposed at the first side of the fourth pixel is wider than the second width, a fifth width of the light blocking member disposed at the second side of the fifth pixel is wider than the third width, a sixth width of the light blocking member disposed at the first side among the edges of the sixth pixel is narrower than the fourth width, and a seventh width of the light blocking member disposed at the second side of the seventh pixel is narrower than the fifth width.

17. The liquid crystal display of claim 16, wherein:
a width of an opening of the first pixel between two adjacent light blocking members overlapping the first pixel is different from a width of the opening of the second pixel, the third pixel, the fourth pixel, the fifth pixel, the sixth pixel, and the seventh pixel.

18. The liquid crystal display of claim 16, wherein:
the plurality of pixels further includes
an eighth pixel disposed at an edge portion of the liquid crystal display to the first side of the first pixel, and
a ninth pixel disposed at the edge portion of the liquid crystal display to the second side of the first pixel,
wherein an eighth width of the light blocking member disposed at the first side of the eighth pixel and a ninth width of the light blocking member disposed at the second side of the ninth pixel is nearly the same as the first width of the light blocking member disposed adjacent to the first pixel.

19. The liquid crystal display of claim 18, further comprising:
a sealant disposed at the first side of the eighth pixel and the second side of the ninth pixel.

* * * * *